May 5, 1964     I. J. BARSY ETAL     3,132,065
SEMI-CONDUCTIVE SURFACE COVERINGS AND METHOD OF MANUFACTURE
Filed Aug. 9, 1960
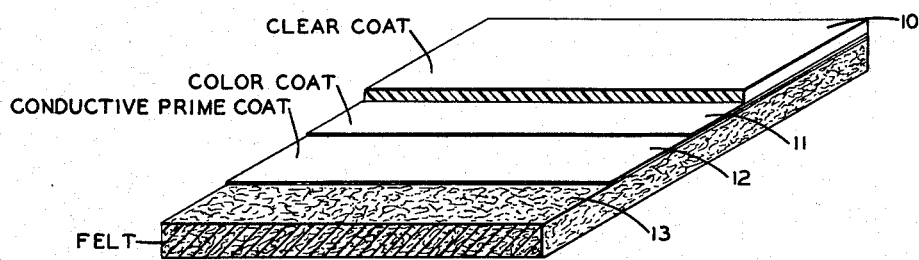
INVENTOR.
IMRE J. BARSY
ROBERT P. DESCH 3,132,065
SEMI-CONDUCTIVE SURFACE COVERINGS AND
METHOD OF MANUFACTURE
Imre J. Barsy, Lancaster Township, Lancaster County, and Robert P. Desch, East Hempfield Township, Lancaster County, Pa., assignors to Armstrong Cork Company, Lancaster, Pa., a corporation of Pennsylvania
Filed Aug. 9, 1960, Ser. No. 48,347
5 Claims. (Cl. 161—165)

This invention relates to semi-conductive surface coverings which are capable of dissipating static electricity and to a method of making the same. More particularly this invention relates to resilient floor products which are comprised of a decorative layer and a clear, thermoplastic wear layer bonded to a backing felt, said products characterized by being semi-conductive and capable of dissipating static electricity and to a method of making such products.

Many plastic sheet goods such as polyvinyl chloride and polyethylene are considered good insulators and, in dry weather, when a piece of such a plastic sheet material is rubbed with a dry cloth, the rubbed area becomes electrostatically charged by friction. In recent years the resilient floor product industry has made wide use of thermoplastic compositions in the production of resilient, decorative floor products. Resilient surface coverings made from thermoplastic compositions having high resistivity exhibit good insulating qualities and, in dry conditions, the surfaces become readily electrostatically charged. These electrostatic charge accumulations frequently manifest themselves in adverse effects which are visually observable and include lint and dirt adherence and retention by the charged surface. Also electric spark and somewhat unpleasant sensation of shock may be experienced when an individual nearly contacts or contacts a grounded conductive object. Other adverse effects are realized during the manufacture of the sheet goods, such as sticking together of sheets, dirt retention and fire hazard.

Conductive, resilient floor products have been produced in the past, especially for use in hospital rooms and other areas where the danger of ignition by electrostatic discharges exists. Serious technical problems, however, have existed in this field insofar as many of the resilient products suggested which would overcome these disadvantages contained a predominance of conductive carbon black or graphite dispersed throughout the plastic composition, and the use of such material in the plastic composition to dissipate static charges severely limited the number and types of patterns in a given line of floor products.

In recent years pattern diversification in resilient floor products has been achieved by applying a decorative layer to a felt base after which coats of clear thermoplastic resins are applied to form a clear thermoplastic wear layer through which the design achieved in the decorative layer is readily visible. Rotogravure processes have been utilized to achieve many stylized design effects in resilient floor products either by printing on a clear film of thermoplastic composition prior to laminating the film to a felt backing or by printing on a prime coated felt after which an organosol clear coat is applied to the printed felt material. It is readily evident that it would be impossible to make such floor products semi-conductive and capable of dissipating electrostatic charges by dispersing conductive particles throughout the thermoplastic wear layer without destroying the design effects achieved in such products.

The primary object of this invention is to provide a resilient surface covering characterized by being semi-conductive and capable of dissipating static electricity wherein the surface covering is comprised of a thermoplastic wear layer of high resistivity bonded to a suitable backing felt.

A further object of this invention is to provide a process for making a resilient surface covering having electrically conductive characteristics wherein the resultant surface covering is comprised of a decorative layer and a clear thermoplastic wear layer bonded to a felt backing.

Another object of this invention is to achieve diversification of patterns and colors in resilient surface coverings while retaining semi-conductive characteristics such that the coverings are capable of dissipating static electricity charges.

These and other objects have been accomplished by providing a resilient surface covering comprised of a thermoplastic wear layer bonded to a backing felt wherein the backing felt is coated with a continuous conductive prime coat having a surface resistivity of less than $10^9$ ohms. The resilient surface covering thus formed is semi-conductive and is capable of dissipating static electricity.

The thermoplastic wear layer preferably is comprised of clear, unpigmented thermoplastic resin composition backed by a decorative layer such as a printed base coat, or a layer comprised of printed paper. In addition it is contemplated that clear sheets of thermoplastic material may be printed on one side with any desired design and laminated to the prime coated backing felt to provide the decorative surface covering.

Referring to the drawing, which illustrates an embodiment of this invention, the appropriate legends in the figure are used to represent the thermoplastic wear layer or clear coat 10, the color coat 11, the conductive prime coat 12, and the felt backing 13.

The clear, thermoplastic wear layer may be formed of any suitable unpigmented, thermoplastic composition such as clear coats formed from polyvinyl latexes and acrylic latexes such as an aqueous emulsion of ethyl acrylate-methyl methacrylate copolymer, organosols such as plasticized polyvinyl chloride resins in mineral spirits and clear sheets of thermoplastic composition. Preferably, the wear layer should have a maximum thickness of about 20 mils.

The decorative layer may be comprised of one or more color coats containing thermoplastic resin, plasticizer, filler and pigment, a printed paper layer of any desired design, a direct print of any desired design on one surface of clear, thermoplastic sheet material when the floor product is formed by laminating a printed plastic sheet to the prime coated felt backing, or a printed base coat.

For the felt backing, it is contemplated that any of the well-known backing materials utilized in the production of resilient floor products, including asphalt saturated felts, burlap, and synthetic rubber, beater saturated asbestos fiber sheets may be used.

In order to achieve a resilient surface covering characterized by being semi-conductive and capable of dissipating static electricity, the backing felt is coated with a continuous conductive prime coat having a surface resistivity of less than about $10^9$ ohms. For additional protection against electric shock, the resistance of the floor shall be more than 25,000 ohms, as measured between a ground connection and an electrode placed at any point on the floor and also as measured between two electrodes placed three feet apart at any points on the floor. All of the products illustrated in the following examples had resistances well above 25,000 ohms.

The following is illustrative of specific embodiments of this invention.

CONDUCTIVE PRIME COAT FORMULATION

| Ingredients: | Weight (grams) |
| --- | --- |
| Water | 225.0 |
| 55% polyvinyl acetate emulsion (Elvacet 81–900) | 221.6 |
| Defoamer (Nopco J.M.Y.) | 4.3 |
| Polyester type plasticizer (Hercoflex 900) | 65.6 |
| Nonionic wetting agent, polyethylene glycol tertdodecyl (Nonic 218) | 1.8 |
| Anionic dispersant, anionic sodium salt of a carboxylated electrolyte (Tamol 731) | 9.5 |
| Clay filler (Afton clay) | 50.0 |
| $CaCO_3$ filler (Ramboy whiting) | 425.0 |
| Fine particle size high structure furnace carbon, 30% black by weight (Aquablak–15) | 83.3 |

*Mixing procedure.*—To 150 cc. of water were added the polyvinylacetate emulsion, defoamer, plasticizer, and wetting agent. The fine particle size carbon black (22 millimicrons) was than added and the batch was mixed for 5 minutes. The dispersant and the fillers along with the remaining water were then added and mixing was continued for 10 minutes.

COLOR COAT FORMULATION

| Ingredients: | Weight (grams) |
| --- | --- |
| Water | 215 |
| 55% polyvinylacetate emulsion (Elvacet 81–900) | 388 |
| Defoamer (Nopco J.M.Y.) | 3.8 |
| Polyester type plasticizer (Hercoflex 900) | 53.3 |
| Nonionic wetting agent, polyethylene glycol tertdoceyl (Nonic 218) | 1.8 |
| Pigment ($TiO_2$) | 200 |
| Anionic dispersant, anionic sodium salt of a carboxylated electrolyte (Tamol 731) | 16 |
| Whiting ($CaCO_3$) | 600 |

The above formulation is illustrative of a white color coat and of course, the color may be varied in printing by substituting other colored pigments for the $TiO_2$ ingredient.

In preparing specific embodiments of this invention, standard asphalt saturated felt backing material was coated with the conductive prime coat to yield a continuous conductive prime coat having a thickness of from 1 to 1.5 mils. The prime coated backing material was then color coated with several separate color coats to give the desired design, the average thickness of the color coat being about 5 mils.

A sample of the asphalt saturated felt having a prime coat and color coats as above-described was set aside. Additional samples of flooring products were then prepared from the asphalt saturated felt, having a prime coat and color coats as above-described, by coating this backing material with two clear coats, the first clear coat being an acrylic clear coat to which was after applied a vinyl clear coat. The acrylic clear coat used in preparing the flooring products was an ethyl acrylate-methyl methacrylate copolymer latex which was dried and fused to yield a clear, thermoplastic layer after which a vinyl latex was applied thereover, dried, and fused, the vinyl being a polyvinyl chloride latex. A series of floor products were made up having regular clear coats (dry) of the following thicknesses: 5 mils (2 mils vinyl, 3 mils acrylic), 10 mils (5 mils vinyl, 5 mils acrylic), 12 mils (6 mils vinyl, 6 acrylic), and 15 mils (7.5 mils vinyl and 7.5 mils acrylic).

In order to demonstrate the semi-conductive characteristic of floor products prepared with the conductive prime coat and the ability of these floor products to dissipate static electricity, measurements were made of the electrostatic charge formation-dissipation characteristics of the above-described floor products and of the electrostatic charge formation-dissipation characteristics of standard floor products formed as above-described with the conductive prime coat omitted.

A standard asphalt saturated felt backing material, the same as that above-described, was prime coated with the regular color coat containing $TiO_2$. Color coats were then applied to the prime coated felt, to form a 5 mil coat, on a dry basis, the color coats being the same in composition as the color coats above-described. A sample of this material was set aside, and a floor product was produced from the remainder by applying 2 mils of an acrylic clear coat and 2 mils of a vinyl clear coat as above-described to yield a final clear coat of 4 mils thickness (dry).

Surface resistivity measurements were made on the backing felt coated with the regular prime coat containing the titanium dioxide and on the backing felt coated with the conductive prime coat containing the Aquablak-15. The surface resistivity is a measurement of the resistance of the prime coat itself.

The method used in measuring the surface resistivity of the prime coat on the backing felt is as follows: Samples 6″ x 6″ x 0.046″ thick were prepared for these tests. A circular disc 4″ in diameter is then cut from these samples and conditioned for a minimum of 24 hours at 70° F. and 50% relative humidity. Surface resistance measurements are made in accordance with Tentative Methods of Test for Electrical Resistance of Insulating Materials, ASTM designation D–257–57T. The method consists, essentially, of measuring the resistance between two electrodes on the surface of a specimen, in terms of the ratio of the D.-C. voltage applied to the electrodes to the current between them which flows in a thin surface layer (viz. the thin layer of conductive prime coat on the surface of the felt backing).

A three-electrode arrangement is used, two on the top and one on the bottom surface of the sample, the latter being the guarded electrode. The electrodes are made of brass and have the following diameters: #1 top electrode 2″; #2 top electrode I.D. of ring 3.25″, O.D. of ring 4.0″; the bottom electrode 4.5″. The resistance of a ring on the surface ¼″ wide, using tinfoil electrodes on the surface of the sample between the electrodes and sample, was then measured. The measuring instrument used for high resistances is a Federal Telephone and Radio Company type FT–H4 Teraohmmeter, calibrated directly in resistance units. The low resistances, i.e. resistivities of the conductive coats, were measured with an R.C.A. ultrasensitive D.-C. microammeter model WV–84A. Voltages were measured with a Simpson model 260 volt-ohm-milliammeter. Voltage applied to the electrodes is 275 volts, and resistance readings are taken at the end of one minute of electrification. The surface resistivity $\sigma$ is computed from the relation:

$$\sigma = \frac{P}{g} \times R_s$$

in which $R_s$ is the surface resistance, in ohms, measured as outlined, P is the effective perimeter of the guarded electrode, and $g$ is the distance between electrodes.

The surface resistivities of prime coats on the asphalt saturated backing felt, when measured as above-described, are as follows:

Regular prime coat ($TiO_2$ containing) = $4.96 \times 10^{11}$ ohms.

Conductive prime coat (containing Aquablak-15) = $1.24 \times 10^7$ ohms.

The method of evaluation of electrostatic charge formation-dissipation characteristics of the prime coated materials and of the clear thermoplastic resin coated flooring products is as follows:

In general this test is performed on the finished material and samples in strip form, approximately 4″ x 12″, are preferred for this test. A Keithley model 200A vacuum tube electrometer (voltmeter) with a capacitive coupling static detector (Keithley model 2005) is used for measuring the relative electrostatic charge concentration on the surface areas of materials under test. Qualitative measurements are made on a given sample immediately after its surface has been systematically and briskly rubbed with a wool cloth to generate a charge on said surface. Reliable results are obtained when the tests are conducted under nearly identical and constant relative humidity and ambient temperature conditions, the following test results being obtained under conditions of relative humidity and temperature where the relative humidity was 35% and the temperature was 70°–80° F.

As stated above the results obtained are qualitative and this is not an absolute test. However, it is a reliable comparison of materials in two regards: (1) the relative magnitude of charge (as a voltage measurement) that can be generated, if any, and (2) the ability of the material to leak away or dissipate the charge rapidly. A comparison with a standard sample of untreated material readily shows when a given treatment has been effective. For acceptable static dissipation characteristics, this test should show a deflection of less than one volt on an eight-volt scale. Essentially, the lower the deflection, the better the static inhibition or dissipation characteristic of the test material. When plastic sheet goods show deflections greater than 1 volt under these test conditions, the goods exhibit static charge build-up in dry weather resulting in the adverse effects mentioned hereinbefore.

Table I sets forth the electrostatic charge formation-dissipation characteristics of the several samples prepared as above-described.

*Table I*

| Sample Description | Static Charge (Deflection in Volts) |
|---|---|
| 1. Asphalt saturated felt—regular prime and color coats, no clear coat. | Greater than 4.0 volts. |
| 2. Asphalt saturated felt—regular prime and color coats, 4 mils (dry) clear coats. | Do. |
| 3. Asphalt saturated felt—conductive prime coat, regular color coats, no clear coats. | 0.1 volt. |
| 4. Asphalt saturated felt—conductive prime coat, regular color coats, 5 mils (dry) clear coats. | 0.2 volt max. |
| 5. Asphalt saturated felt—conductive prime coat, regular color coats, 10 mils (dry) clear coats. | 0.3 volt. |
| 6. Asphalt saturated felt—conductive prime coat, regular color coats, 12 mils (dry) clear coats. | 0.6 volt. |
| 7. Asphalt saturated felt—conductive prime coat, regular color coats, 15 mils (dry) clear coats. | Do. |

Table I clearly illustrates the effectiveness of specific embodiments of this invention in eliminating or minimizing the deleterious effects such as lint adherence, shock hazards or nuisance, of friction generated electrostatic charge in resilient surface coverings comprised of a thermoplastic wear layer of high resistivity bonded to a backing felt. The action of the conductive prime coat in dissipating static charge is not completely understood in view of the fact that it has to act through a good electrical insulating film, such as the vinyl and acrylic clear coats above-illustrated, of significant thicknesses of up to 15 mils or more of clear coat and of up to 5 mils or more of color coat. The intimate contact of the conductive coat and insulating film is thought to enhance a capability of spreading out laterally the concentrated high intensity charge on a small area over a large over-all area, thereby lowering considerably the charge density per unit area of the originally charged surface.

By way of further illustration, two separate prime coats were made up in which graphite was substituted, in the same amount, for the Aquablak-15 in the conductive prime coat formulation set forth above. The graphite was supplied by Asbury Graphite Mills, Incorporated, under the trade name designations #OOM-7, finely micronized flake graphite, and #A-98, a synthetic graphite. The surface resistivity of the prime coat on an asphalt saturated backing felt measured $4.15 \times 10^{11}$ ohms when #OOM-7 graphite was substituted for the Aquablak-15 and $4.69 \times 10^{11}$ ohms when #A-98 graphite was substituted for the Aquablak-15. Table II sets forth the charge formation-dissipation characteristics of asphalt saturated felts prime coated with the conductive coat and of asphalt saturated felts prime coated with the graphite containing prime coats, the prime coated felts having after applied regular color coats and regular clear coats as outlined hereinbefore.

*Table II*

| Sample Description | Surface Resistivity of Prime Coat on Backing Felt (ohms) | Static Charge (Deflection in Volts) |
|---|---|---|
| 1. Asphalt saturated felt, conductive prime coat (Aquablak-15), 5 mil color coat, 5 mil (dry) clear thermoplastic coat. | $1.24 \times 10^7$ | 0.2 volt max. |
| 2. Asphalt saturated felt, conductive prime coat (Aquablak-15), 5 mil color coat, 15 mil (dry) clear thermoplastic coat. | $1.24 \times 10^7$ | 0.6 volt. |
| 3. Asphalt saturated felt, #OOM-7 graphite containing prime coat, 5 mil color coat, 4 mil (dry) clear thermoplastic coat. | $4.15 \times 10^{11}$ | Greater than 4.0 volts. |
| 4. Asphalt saturated felt, #A-98 graphite containing prime coat, 5 mil color coat, 4 mil (dry) clear thermoplastic coat. | $4.69 \times 10^{11}$ | Do. |

As Table II clearly illustrates the prime coats containing the graphite had too high surface resistivities, and floor products formed therewith failed to dissipate the static charges built up thereon. In both instances where prime coats containing the graphite were used to coat the asphalt saturated felt, the flooring products produced therewith had thin coats of clear thermoplastic wear coats. Even so, the prime coat failed to dissipate the static electricity to the extent dissipated by the conductive prime coated sample which had a 15 mil clear thermoplastic wear coat.

For purposes of illustration the conductive prime coats set forth in the specific embodiments of this invention all contain Aquablak-15, a carbon black produced by Columbian Carbon Company, New York 17, New York. The Aquablak-15 is specifically designed as a material of high electrical conductivity and contains high structure furnace carbon. Aquablak-15 is supplied as an aqueous emulsion and has the following characteristics:

Percent black by weight _____ 30
Particle size (millimicrons) _____ 22
pH _____ 10 to 11
Specific gravity _____ 1.20
Weight per solid gallon (pound) _____ 10

It will be readily evident to one skilled in the art that particles of other high electrically conductive materials having very fine particle size may be substituted for the Aquablak-15, the specific requirement being that the prime coat produced therefrom have a surface resistivity less than about $10^9$ ohms. Also other concentrations of Aquablak-15 yielding prime coats having surface resistivities less than $10^9$ ohms could be used equally as well.

The following further illustrates the use of other types of felt base backing materials as well as the use of organosol clear coats in place of the vinyl clear coat and the acrylic clear coat in floor products produced in accordance with this invention. More specifically, a synthetic rubber beater saturated asbestos fiber felt 0.039″ thick was substituted for the asphalt saturated felt backing layer. The organosol used for clear coating had the following formulation.

Ingredients: Parts by weight
- Dispersion grade high molecular weight polyvinyl chloride resin powder (Marvinol VR–50) _____ 100
- Epoxidized soya-plasticizer (Paraplex G–62) ___ 5
- Di-2-ethyl-hexyl phthalate _____ 20
- Tin mercaptide _____ 1.5
- Polyethylene glycol 400 monolaurate _____ 2
- Mineral spirits _____ 15

Samples were made up in accordance with the procedures outlined above except that a base coat of the following formulation was applied to the felt, where no conductive prime coat was used, and to the conductive prime coat.

BASE COAT FORMULATION

Ingredients: Parts by weight
- Water _____ 119.0
- Ethylacrylate-methyl methacrylate copolymer latex, 46% solids (Rhoplex AC–33) _____ 698.2
- Tributyl phosphate _____ 3.9
- Pine oil _____ 2.6
- Anionic sodium salt of a carboxylated electrolyte (Tamol 731) _____ 26.8
- Pigment grade, $TiO_2$ _____ 237.5
- $CaCO_3$ (Ramboy whiting) _____ 675.0
- Clay (Afton clay) _____ 50.0

Table III sets forth the electrostatic charge formation-dissipation characteristics of the samples thus prepared.

*Table III*

| Sample Description | Surface Resistivity of Prime Coat on Backing Felt (ohms) | Static Charge (Deflection in Volts) |
|---|---|---|
| 1. Beater saturated asbestos felt, base coat, no clear coat. | $5.63 \times 10^{11}$ | 2.9 volts. |
| 2. Beater saturated asbestos felt, base coat, 4 mil (dry) organosol clear coat. | $5.63 \times 10^{11}$ | Greater than 3 volts. 2d test—Greater than 4 volts. |
| 3. Beater saturated asbestos felt, continuous conductive prime coat, base coat, no clear coat. | $1.24 \times 10^7$ | 0.2 volt. 2d test—0.2 volt. |
| 4. Beater saturated asbestos felt, continuous conductive prime coat, base coat, 4 mil (dry) organosol clear coat. | $1.24 \times 10^7$ | 0.2 volt. |
| 5. Beater saturated asbestos felt, continuous conductive prime coat, base coat, 8 mil (dry) organosol clear coat. | $1.24 \times 10^7$ | Do. |

Table IV sets forth the electrostatic charge formation-dissipation characteristics of samples in which a sheet of resin-saturated bleached kraft paper, four mils in thickness, was substituted for the color coat and in which a clear organosol coat was utilized for the wear layer.

*Table IV*

| Sample Description | Static Charge (Deflection in Volts) |
|---|---|
| 4 mil (dry) organosol clear coat on paper laminated to to an asphalt saturated felt, no prime coat. | Greater than 4.0 volts. |
| 4 mil (dry) organosol clear coat on paper laminated to an asphalt satruated felt prime coated with continuous conductive prime coat. | 0.2 volt. |
| 8 mil (dry) organosol clear coat on paper laminated to an asphalt saturated felt prime coated with continuous conductive prime coat. | 0.4 volt. |

We claim:

1. A resilient, monolithic, decorative surface covering characterized by being semi-conductive and capable of dissipating static electricity, said covering being comprised of a continuous thermoplastic wear layer of substantially nonconductive plasticized vinyl resin having a maximum thickness of about 20 mils and a backing felt provided with a continuous, conductive prime coat containing high electrically conductive material of fine particle size in an amount sufficient to impart a surface resistivity greater than 25,000 ohms but less than $10^9$ ohms to said prime coat.

2. A resilient surface covering charatcerized by being semi-conductive and capable of dissipating static electricity, said covering being comprised of a decorative layer and a continuous, clear, thermoplastic wear layer of substantially nonconductive plasticized vinyl resin bonded to a felt backing provided with a continuous conductive prime coat containing high electrically conductive material of fine particle size in an amount sufficient to impart a surface resistivity greater than 25,000 ohms but less than $10^9$ ohms to said prime coat, said decorative layer having a maximum thickness of about 5 mils and said wear layer having a maximum thickness of about 15 mils.

3. In a method of making a resilient surface covering wherein a thermoplastic wear layer and a decorative layer are bonded to a backing felt to form a monolithic resilient surface covering having a continuous thermoplastic wear layer of substantially nonconductive plasticized vinyl resin of a maximum thickness of about 20 mils, the improvement which comprises bonding said wear layer and decorative layer to a felt having a continuous conductive prime coat containing a high electrically conductive material of fine particle size in an amount sufficient to impart a surface resistivity greater than 25,000 ohms but less than about $10^9$ ohms to said prime coat, to form a resilient surface covering characterized by being semi-conductive and capable of dissipating static electricity.

4. A method in accordance with claim 3 in which said thermoplastic wear layer has a maximum thickness of about 15 mils and in which said decorative layer has a maximum thickness of about 5 mils.

5. A resilient, monolithic, decorative surface covering characterized by being semi-conductive and capable of dissipating static electricity, said covering being comprised of a continuous thermoplastic wear layer of substantially nonconductive plasticized vinyl resin having a maximum thickness of about 20 mils and a backing felt provided with a continuous, conductive prime coat, said prime coat containing electrically conductive high structure furnace carbon of fine particle size in an amount sufficient to impart a surface resistivity greater than 25,000 ohms but less than $10^9$ ohms to said prime coat.

References Cited in the file of this patent

UNITED STATES PATENTS

| 2,287,755 | Davis _____ | June 30, 1942 |
| 2,325,414 | McChesney et al. _____ | July 27, 1943 |
| 2,341,360 | Bulgin _____ | Feb. 8, 1944 |
| 2,589,502 | Lurie _____ | Mar. 18, 1952 |
| 2,729,770 | Robbins _____ | Jan. 3, 1956 |

FOREIGN PATENTS

| 371,812 | Great Britain _____ | Apr. 26, 1932 |